(No Model.)
R. FAAS & W. MECHWART.
TIRE FOR BICYCLES.
No. 585,466. Patented June 29, 1897.
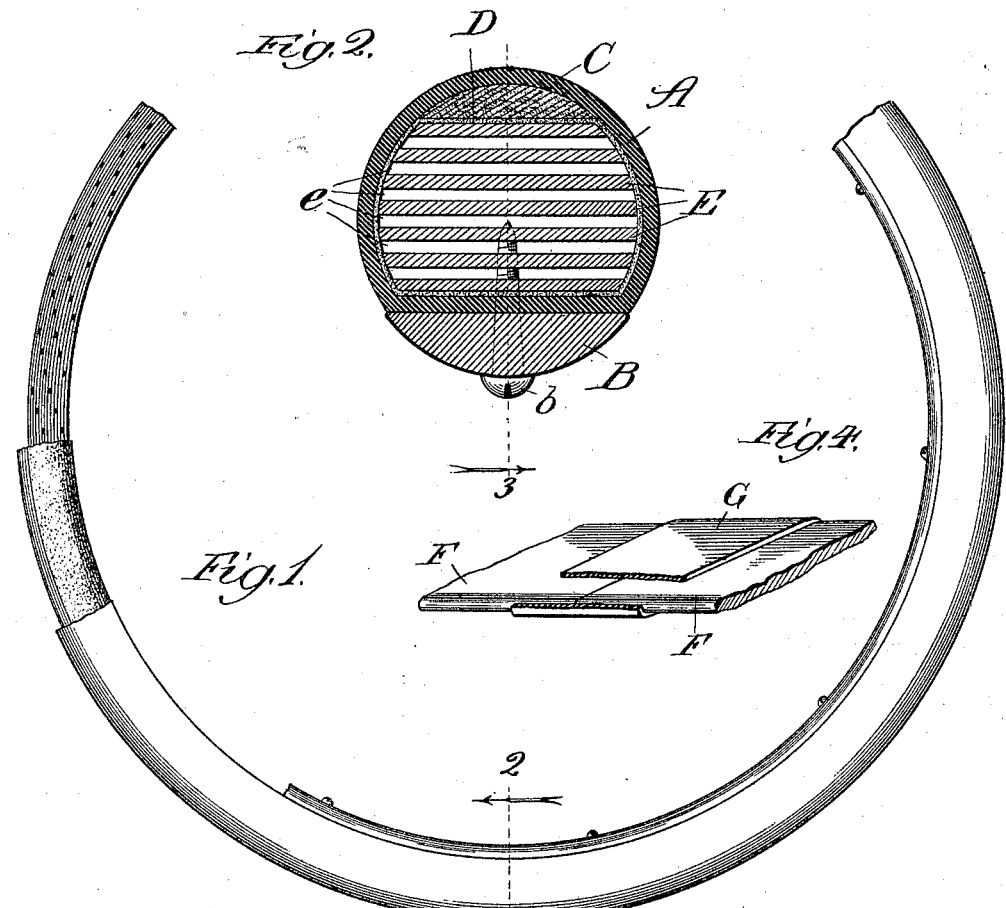
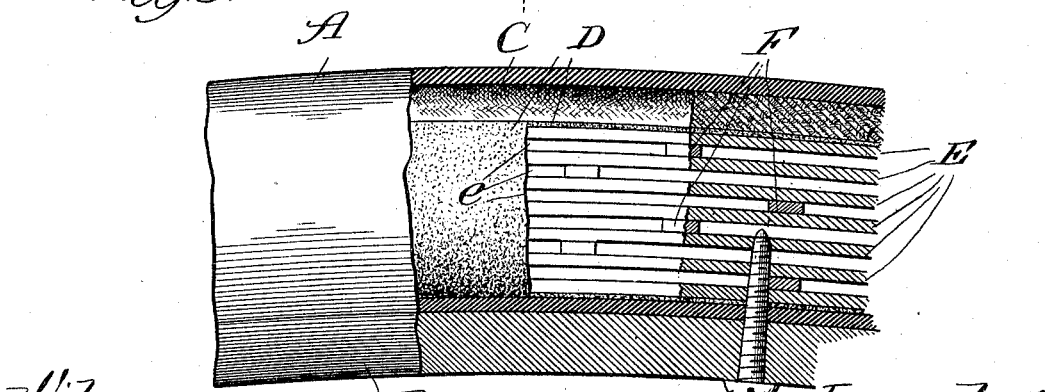
Witnesses:
Inventors
Rudolph Faas,
William Mechwart
By H. C. Hunsberger
Atty.

UNITED STATES PATENT OFFICE.

RUDOLPH FAAS AND WILLIAM MECHWART, OF CHICAGO, ILLINOIS, ASSIGNORS TO THE NO-PUNCTURE TIRE COMPANY, OF SAME PLACE.

TIRE FOR BICYCLES.

SPECIFICATION forming part of Letters Patent No. 585,466, dated June 29, 1897.

Application filed November 16, 1896. Serial No. 612,217. (No model.)

*To all whom it may concern:*

Be it known that we, RUDOLPH FAAS and WILLIAM MECHWART, of the city of Chicago, county of Cook, and State of Illinois, have invented a new and useful Improvement in Elastic Tubular Tires for Bicycles or other Vehicles, of which the following is a specification.

The object of our invention is to provide a tubular tire which is noiseless and elastic, cheap and durable, easily constructed, and light as to weight, which will avoid the inconveniences attending puncture incident to the present pneumatic tubular tire, reference being had to the accompanying drawings, in which—

Figure 1 is a broken elevation of a tire with a portion of the rim. Fig. 2 is an enlarged transverse section taken on line 2, Fig. 1. Fig. 3 is a broken sectional elevation taken on line 3, Fig. 2. Fig. 4 is a perspective view showing manner of fastening ends of strips.

A is the outer rubber tire or covering.
B is the rim of the wheel.
C is a felt cushion under outer covering.
D is the canvas covering.
E is a longitudinal layer of thin wood slats.
e is the space between the slats.
F is a felt cushion in spaces between the slats.
G is a metal ferrule for fastening the ends of the slats or strips of wood.

Similar letters refer to similar parts throughout the drawings.

In the construction of our improved tire we use the ordinary rubber outer covering A for the tire or a similar covering of other material should we prefer it; but instead of the inner tube of inflated rubber as now used in the construction of the present pneumatic tire we construct a tube composed of long thin slats or strips of wood E of the width of an ordinary tire and about one-sixteenth of an inch in thickness and wind it on the circumference of the rim B of the wheel loosely five, six, or more times, as may be required for the purpose, until the proper space is filled, as in Fig. 2, much as a ribbon is wound on a spool. When the slats or strips are so arranged, the ends are secured by means of the metal ferrule G. As the slats or strips are not wound tightly, we place between the interstices e at intervals cushions or strips of felt F. Having thus arranged the slats or strips of wood in proper shape for the tire and secured compactly, the outer edges of the wooden strips are then rounded, so as to partake a tubular form, to be readily inserted into the outer rubber covering, as shown in Fig. 1. We then take a narrow strip of canvas and wind it around the tube of wood and felt and completely inclose it, making it compact, yet elastic, as shown by D, Fig. 3. The tube thus constructed is then ready to be inserted into the rubber or outer casing A. Between the outer covering A and the inner tube as above constructed we place another strip of felt C to serve as a cushion between the inner tube and the outer covering A. In the construction of the wheel the tubular tire is then secured to the rim B by means of screws b at intervals. The tire thus constructed is elastic, light, and durable and requires no inflation.

While we are aware that various methods have been devised to avoid the use of inflated tubes in the construction of tubular tires,

What we claim as new, and desire to secure by Letters Patent, is—

1. In the construction of an elastic tubular tire the combination of an outer covering of rubber, an inner cushion of felt, an inner tube, composed alternately of thin wooden slats or strips and short strips of felt, and firmly inclosed in canvas, as and for the purpose above described.

2. In the construction of an elastic tubular tire, the combination of an inner tube, composed of one or more ribbons of tough elastic wood wound on the circumference of the rim, with cushions of felt, and wrapped with canvas, as and for the purpose above described.

3. In the construction of an elastic tubular tire, an inner cushion of felt, an inner tube composed of thin strips of elastic wood separated at intervals by cushions of felt and inclosed in canvas, the whole being secured to the rim by screws, as and for the purpose above described.

4. In the construction of an elastic tubular tire, an inner tube composed of thin slats or strips of wood, the ends secured by a metal ferrule, the interstices cushioned with strips of felt, said tube covered with canvas, having a cushion of felt between the inner tube and outer covering, as and for the purpose specified.

RUDOLPH FAAS.
WILLIAM MECHWART.

Witnesses:
H. C. HUNSBERGER,
NATHAN LOWITZ.